(12) United States Patent
Hall et al.

(10) Patent No.: US 7,656,309 B2
(45) Date of Patent: Feb. 2, 2010

(54) SYSTEM AND METHOD FOR SHARING INFORMATION BETWEEN DOWNHOLE DRILL STRINGS

(76) Inventors: David R. Hall, 2185 S. Larsen Pkwy., Provo, UT (US) 84606; Joe Fox, 2185 S. Larsen Pkwy., Provo, UT (US) 84606

( * ) Notice: Subject to any disclaimer, the term of this patent is extended or adjusted under 35 U.S.C. 154(b) by 262 days.

(21) Appl. No.: 11/428,993

(22) Filed: Jul. 6, 2006

(65) Prior Publication Data

US 2008/0024318 A1   Jan. 31, 2008

(51) Int. Cl.
*G01V 3/00* (2006.01)
(52) U.S. Cl. .................. 340/854.6; 166/65.1; 166/66; 175/45; 175/50
(58) Field of Classification Search .......... 340/854.6; 175/45, 50; 166/65.1, 66
See application file for complete search history.

(56) References Cited

U.S. PATENT DOCUMENTS

| | | | |
|---|---|---|---|
| 2,414,719 A | | 1/1947 | Cloud |
| 3,853,185 A | * | 12/1974 | Dahl et al. ............... 340/853.4 |
| 3,967,201 A | | 6/1976 | Rorden |
| 4,416,494 A | | 11/1983 | Watkins |
| 4,785,247 A | | 11/1988 | Meador |
| 4,806,928 A | | 2/1989 | Vereruso |
| 5,131,477 A | * | 7/1992 | Stagg et al. .................. 175/40 |
| 6,392,317 B1 | | 5/2002 | Hall |
| 6,670,880 B1 | | 12/2003 | Hall |
| 6,717,501 B2 | | 4/2004 | Hall |
| 6,799,632 B2 | | 10/2004 | Hall |
| 6,821,147 B1 | | 11/2004 | Hall |
| 6,830,467 B2 | | 12/2004 | Hall |
| 6,844,498 B2 | | 1/2005 | Hall |
| 6,888,473 B1 | | 5/2005 | Hall |
| 6,913,093 B2 | | 7/2005 | Hall |
| 6,929,493 B2 | | 8/2005 | Hall |
| 6,945,802 B2 | | 9/2005 | Hall |
| 6,968,611 B2 | | 11/2005 | Hall |
| 2001/0013412 A1 | * | 8/2001 | Tubel .................. 166/250.01 |
| 2004/0104797 A1 | | 6/2004 | Hall |
| 2004/0113808 A1 | | 6/2004 | Hall |
| 2004/0145492 A1 | | 7/2004 | Hall |
| 2004/0150532 A1 | | 8/2004 | Hall |
| 2004/0164833 A1 | | 8/2004 | Hall |
| 2004/0164838 A1 | | 8/2004 | Hall |
| 2004/0216847 A1 | | 11/2004 | Hall |

(Continued)

OTHER PUBLICATIONS

U.S. Appl. No. 11/133,905, filed May 21, 2005, Hall, David R.

*Primary Examiner*—Timothy Edwards, Jr.
(74) *Attorney, Agent, or Firm*—Daniel P. Nelson; Tyson J. Wilde; Phillip W. Townsend, III

(57) ABSTRACT

A system for sharing information between downhole drill strings is disclosed in one embodiment of the invention as including a first drill string and a communications network integrated into the first drill string. The communications network includes multiple nodes spaced at selected intervals along the first drill string to gather subterranean data along the first drill string. The system further includes a second drill string and a real-time communication link between the first drill string and second drill string. The communication link is used to transit the subterranean data from the first drill string to the second drill string to control the second drill string.

14 Claims, 8 Drawing Sheets

U.S. PATENT DOCUMENTS

| | | |
|---|---|---|
| 2004/0244916 A1 | 12/2004 | Hall |
| 2004/0244964 A1 | 12/2004 | Hall |
| 2004/0246142 A1 | 12/2004 | Hall |
| 2005/0001735 A1 | 1/2005 | Hall |
| 2005/0001736 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046586 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082092 A1 | 4/2005 | Hall |
| 2005/0092499 A1 | 5/2005 | Hall |
| 2005/0093296 A1 | 5/2005 | Hall |
| 2005/0095827 A1 | 5/2005 | Hall |
| 2005/0115717 A1 | 6/2005 | Hall |
| 2005/0145406 A1 | 7/2005 | Hall |
| 2005/0150653 A1 | 7/2005 | Hall |
| 2005/0161215 A1 | 7/2005 | Hall |
| 2005/0173128 A1 | 8/2005 | Hall |
| 2005/0212530 A1 | 9/2005 | Hall |
| 2005/0236160 A1 | 10/2005 | Hall |
| 2005/0284662 A1 | 12/2005 | Hall |
| 2007/0052551 A1 * | 3/2007 | Lovell et al. ............. 340/854.6 |

* cited by examiner

SYSTEM AND METHOD FOR SHARING INFORMATION BETWEEN DOWNHOLE DRILL STRINGS

BACKGROUND OF THE INVENTION

1. Field of the Invention

The present invention relates to downhole drilling for hydrocarbon reserves, and more particularly, to systems and methods for sharing information between downhole drill strings.

2. Background

The advantages of networking are well known in the computer and IT industries. By interconnecting multiple computers or devices, users of these devices may benefit from sharing information, applications, and resources. This, in turn, reduces costs, improves efficiency, provides redundancy, and the like. By networking various systems or devices together, the resulting network may provide a greater total benefit to teach user that these users could achieve working independently.

Despite the above-mentioned advantages of networks, many drilling operations still work in a relatively isolated manner. That is, although telemetry systems may be used to gather and analyze local downhole data at various drill sites, this data is rarely if ever available to operators at other drill sites. If the data is available, it may be inconvenient to access or the retrieval time may be too long to provide meaningful and timely benefit. The result is that drill sites are often unable to adequately access and capitalize on data gathered at other drill sites.

In some cases, a drilling operator on one lease or tract may be unable to adequately share and access information gathered by a drill string on another lease or tract. This is often true despite the fact that seismic measurements or geological properties such as porosity, permeability, density, resistivity, or other measurements gathered at one drill string may provide valuable to operators of another drill string. The result is waste and unnecessary expense due to the inability to share information and resources between drill strings.

In view of the foregoing what is needed is a system and method for sharing information between drill strings. Ideally, this information would be available in real time to allow drilling parameters of a drill string to be adjusted rapidly in response to data measured at another drill string. Further needed are systems and methods for archiving and providing access to data gathered by these drill strings over time.

SUMMARY OF THE INVENTION

Consistent with the foregoing, and in accordance with the invention as embodied and broadly described herein, a system for sharing information between downhole drill strings is disclosed in one embodiment of the invention as including a first drill string and a communications network integrated into the first drill string. The communications network includes multiple nodes spaced at selected intervals along the first drill string to gather subterranean data along the first drill string. The system further includes a second drill string and a real-time communication link between the first drill string and second drill string. The communication link is used to transit the subterranean data from the first drill string to the second drill string to control the second drill string.

In selected embodiments, the first and second drill strings are located on different leases, which may be located on either the same tract or different tracts. In certain embodiments, the second drill string is an "intelligent" drill string like the first drill string, meaning the second drill includes a communications network integrated therein. In other embodiments, the second drill string is a conventional or "dumb," drill string. In selected embodiments, the system may further include an archival device in communication with the first drill string. This archival device may be used to archive, over a period of time, subterranean data gathered by the first drill string. This subterranean data may then be used to control second drill string.

In another aspect of the invention, a method for sharing information between downhole drill strings includes gathering subterranean data with a first drill string and transmitting the subterranean data along a communications network integrated into the first drill string. The communications network includes multiple nodes spaced at selected intervals along the first drill string. The method further includes providing a second drill string and transmitting, in real-time, the subterranean data from the first drill string to the second drill string. This subterranean data is used to control the second drill string.

In yet another aspect of the invention, a system for sharing information between downhole drill strings includes a first drill string and a communications network integrated into the first drill string. The communications network includes multiple nodes spaced at selected intervals along the first drill string to gather subterranean data therealong. An archival device in communication with the first drill string is used to archive, over a period of time, subterranean data gathered by the first drill string. The system further includes a second drill string and a communication link to transmit the subterranean data from the archival device to the second drill string. This subterranean data may be used to control the second drill string.

The present invention provides novel systems and methods for controlling a downhole drill string. The features and advantages of the present invention will become more fully apparent from the following description and appended claims, or may be learned by the practice of the invention as set forth hereinafter.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment in accordance with the present invention. Thus, use of the phrases "in one embodiment," "in an embodiment," and similar language throughout this specification may, but does not necessarily, all refer to the same embodiment.

Furthermore, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

In the following description, numerous details are disclosed to provide an understanding of embodiments of the invention. One skilled in the relevant art will recognize, however, that the invention may be practiced without one or more of the details, or with other methods, components, materials, and so forth. In other instances, well-known structures, materials, or operations are not shown or described in detail to avoid obscuring aspects of the invention.

Figure 1:
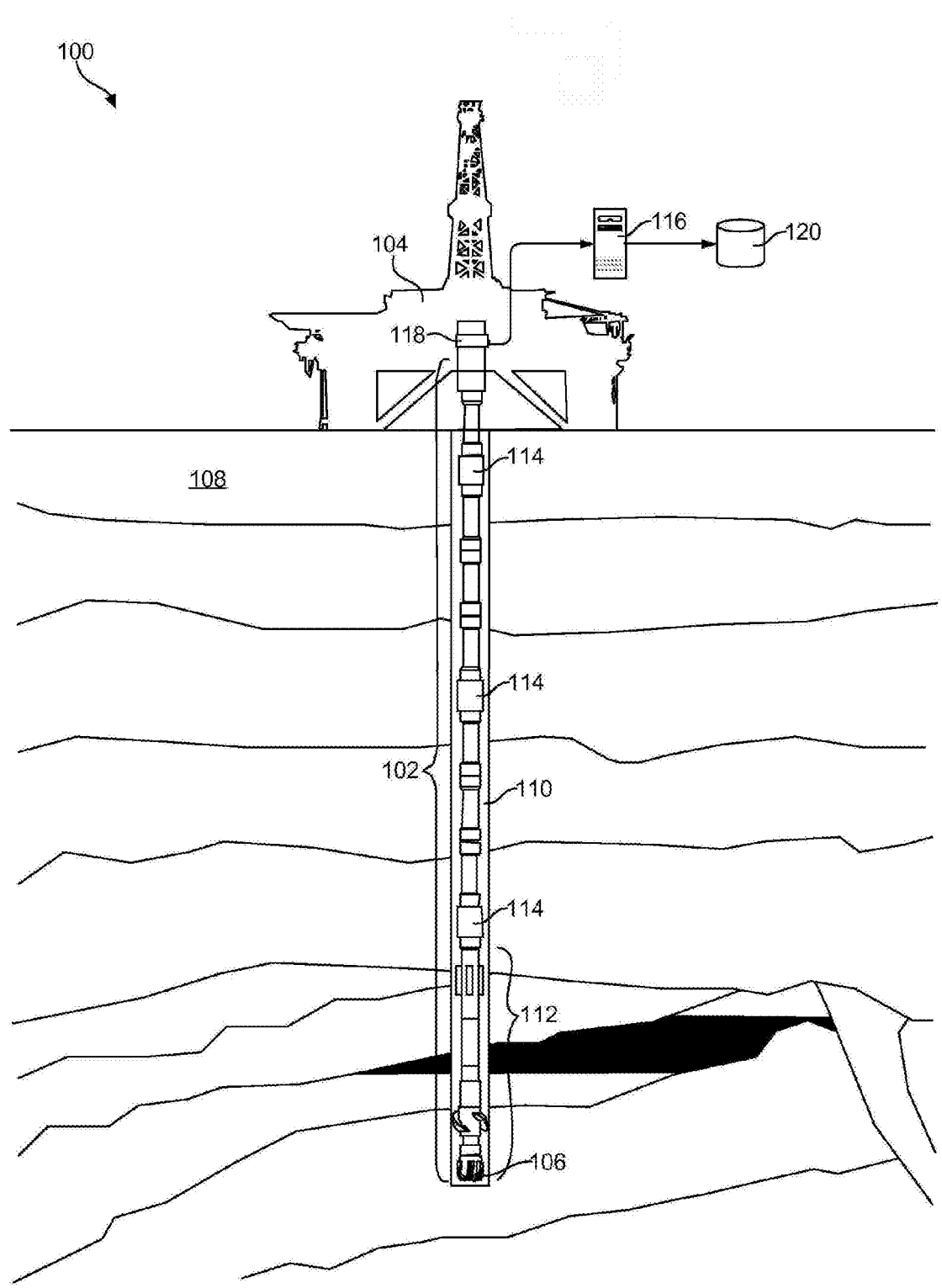
FIG. 1 is a cross-sectional view illustrating one embodiment of an archival device connected to a high-speed downhole communications network for gathering subterranean data.

Referring to FIG. 1, in one embodiment, a system 100 for gathering, archiving, and disseminating geological data in accordance with the present invention includes a drill string 102 comprising multiple sections of drill pipe and other downhole tools. The drill string 102 is typically rotated by a drill rig 104 to turn a drill bit 106 that is loaded against the earth 108 to form a borehole 110. Rotation of the drill bit 106 may alternately be provided by other downhole tools such as drill motors or drill turbines located adjacent to the drill bit 106.

A bottom-hole assembly 112 may include the drill bit 106 as well as sensors and other downhole tools such as logging-while-drilling ("LWD") tools, measurement-while-drilling ("MWD") tools, diagnostic-while-drilling ("DWD") tools, or the like. The drill string 102 may also include other downhole tools such as heavyweight drill pipe, drill collar, stabilizers, hole openers, sub-assemblies, under-reamers, rotary steerable systems, drilling jars, drilling shock absorbers, and the like, which are all well known in the drilling industry.

While drilling, a drilling fluid is typically supplied under pressure at the drill rig 104 through the drill string 102. The drilling fluid typically flows downhole through the central bore of the drill string 102 and then returns uphole to the drill rig 104 through the annulus 110. Pressurized drilling fluid is circulated around the drill bit 106 to provide a flushing action to carry cuttings to the surface.

To transmit information at high speeds along the drill string 102, a communications network comprising multiple network nodes 114 may be integrated into the drill string 102. These network nodes 114 may be used as repeaters to boost the data signal at regular intervals as the signal travels along the drill string 102. The nodes 114 may also be used to interface with various types of sensors to provide points for data collection along the drill string 102. The communications network may include a top-hole server 116, also acting as a node, which communicates with the drill string 102 through a swivel device 118 for transmitting data between the drill string 102 and the server 116. The top-hole server 116 may be used to transfer data and tool commands to and from multiple local and remote users in real time. To transmit data between each of the nodes 114 and the server 116, data couplers and high-speed data cable may be incorporated into the drill pipe and other downhole tools making up the drill string 102. In selected embodiments, the data couplers may be used to transmit data across the tool joint interfaces using induction and without requiring direct contact.

For more detailed information with respect to the communications network, the reader is referred to patent publication number 20050035874 and entitled Distributed Downhole Drilling Network, having common inventors with the present invention, which this specification incorporates by reference. In general the communications network described in the above-named application enables high-speed bi-directional data transmission along the drill string 102 in real-time. This provides various benefits including but not limited to the ability to control downhole equipment, such as rotorary-steerable systems, instantaneously from the surface; transmit full seismic waveforms and logging-while-drilling images to the surface in real time; communicate with complex logging tools integrated into the drill string 102 without the need for wireline cables; control downhole tools with precision and in real time; access downhole data even during loss of circulation events; and monitor pressure conditions, hole stability, solids movement, and influx migration in real time.

The communications network may also provide another significant advantage. As previously mentioned, 4D seismic techniques are being used increasingly to monitor the movement or migration of hydrocarbons within a reserve over time. Nevertheless, conventional seismic measurements taken downhole (i.e., "downhole seismics") typically require wireline cables or other costly and time-consuming techniques. In one embodiment of a system in accordance with the invention, the communications network enables downhole seismic measurements, including 4-D measurements, to be taken directly from the drill string 102 while drilling and without the need for wireline cables.

In addition to seismic data, other types of data may be useful to track the movement or migration of hydrocarbons within a reserve over time. For example, as previously mentioned, resistivity measurements may indicate the presence of hydrocarbons downhole. Like 4-D seismic measurements, changes in these resistivity measurements may be monitored to track the movement or migration of hydrocarbons in a reserve over time. This may hold true for other downhole properties and characteristics as well. For example, changes in subterranean pressure, magnetism, temperature, induction, vibration, radioactivity, salinity, pH, permeability, electrical potential, and the like, to name a few, may provide information with respect to the migration or location of hydrocarbons, or provide other useful data with respect to changes in the downhole environment. Sensors distributed along the drill string 102, and interfacing with nodes 114 of the communications network, enable monitoring of these types of changes in real time as well as over periods of time.

Figure 5:
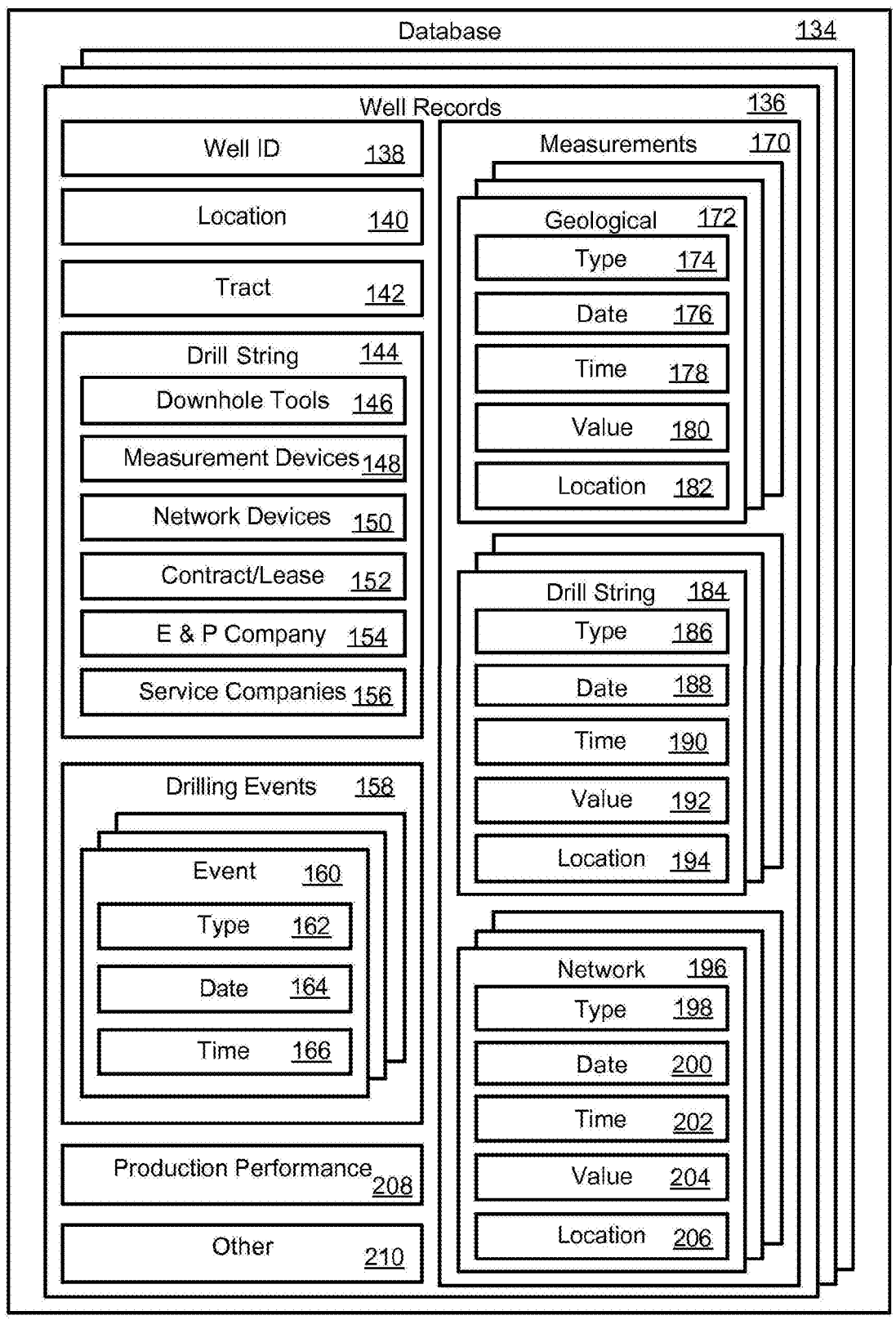
FIG. 5 is a block diagram illustrating one embodiment of a database in accordance with the invention.

To store data gathered by sensors situated along the drill string 102 over time, the communications network may communicate with an archival device 120. The archival device 120 may, in certain embodiments, be located proximate the server 116, on the server 116, or at a location remote from the drill string communications network. The archival device 120 may, for example, include a disk drive, an array of disk drives, a tape drive, any of various optical storage devices (e.g., CD-ROM, DVD, etc.), or other suitable data storage device. This data may, in certain embodiments, be organized in a database to facilitate data management, search, and retrieval. One contemplated embodiment of a database in accordance with the invention is illustrated in FIG. 5. By organizing the data in a database, the data may be made accessible to various entities, such as the public, governmental organizations, private organizations, individual researchers, or the like, to facilitate research with regard to downhole conditions and to improve the extraction of hydrocarbons. In selected embodiments, the data may be marketed for profit to these entities.

Figure 2:
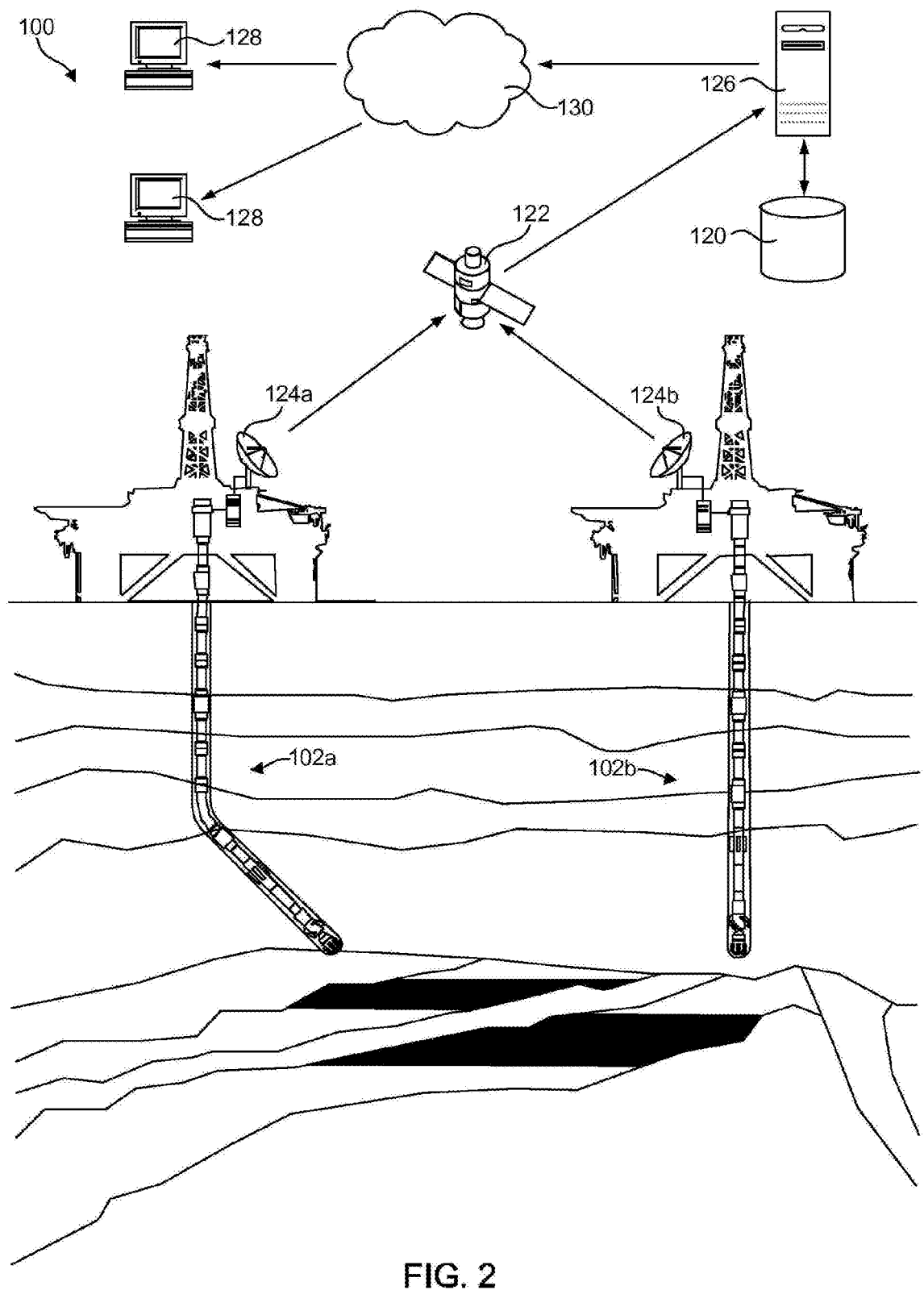
FIG. 2 is a cross-sectional view illustrating one embodiment of an archival device communicating with several high-speed downhole communications networks by way of a satellite.

Referring to FIG. 2, in one embodiment in accordance with the invention, a system 100 for gathering, archiving, and disseminating geological data may comprise one or more drill strings 102a, 102b, each having a downhole communications network integrated therein and adapted to gather downhole data. In selected embodiments, each of the drill strings 102a, 102b may communicate with a satellite 122 by way of antennas 124a, 124b. The satellite 122 may communicate with a remote server 126 or other processing device 126. This server 126 may store data gathered and transmitted from the drill strings 102a, 102b on a remote archival device 120. As previously mentioned, data stored on the archival device 120 may be organized in a database to facilitate the management, search, and retrieval thereof.

As also mentioned, in selected embodiments, data stored in the database may be published or otherwise provided to various users 128, such as the public, governmental organizations, private organizations, individual researchers, or the like. For example, in certain contemplated embodiments, the database may be made available to these users 128 via the Internet 130 or a private network 130. In selected embodiments, the owner of the database may charge the users 128 a fee to access the database.

Figure 3:
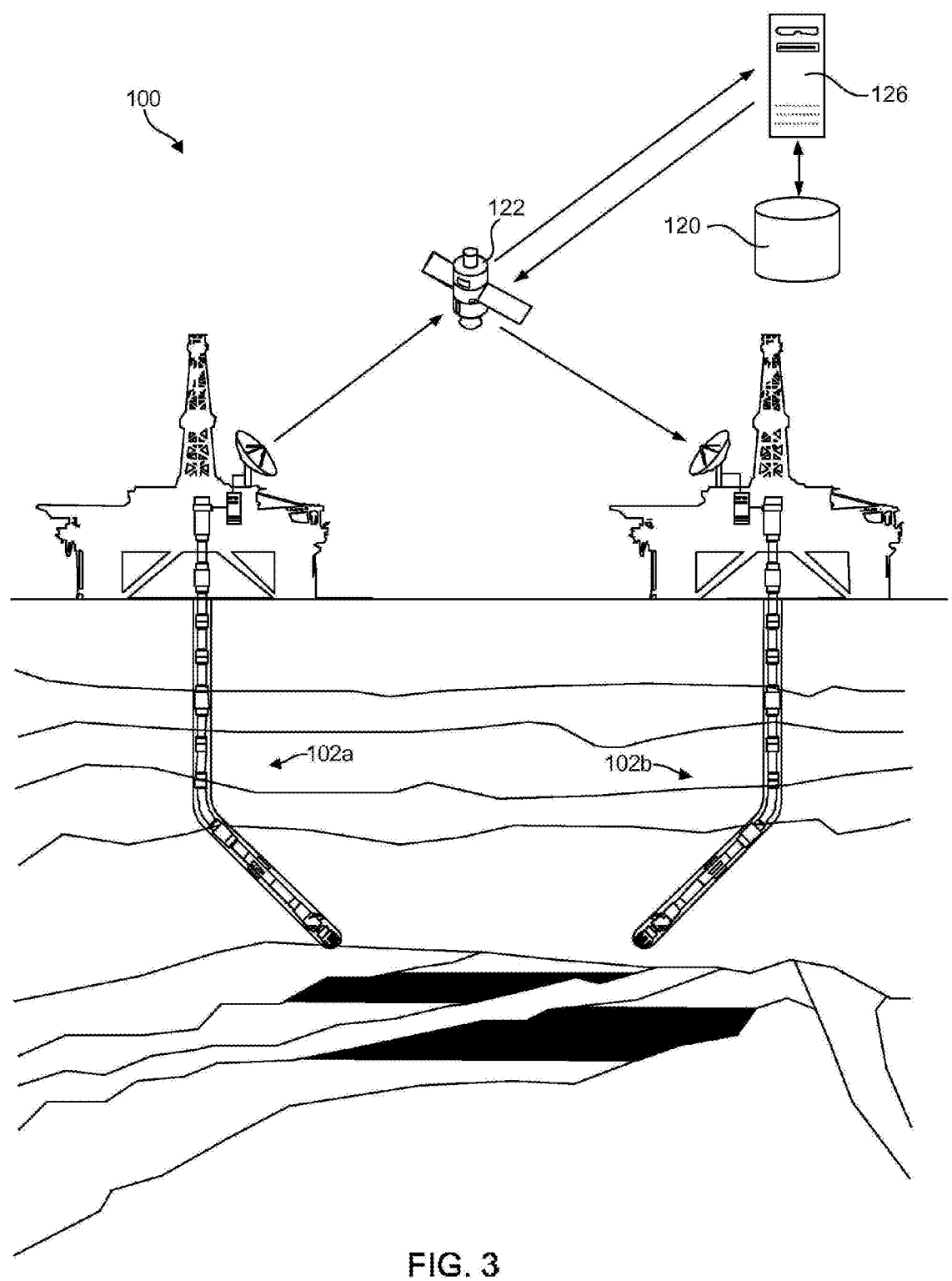
FIG. 3 is a cross-sectional view illustrating one embodiment of an archival device used to direct a drill string toward hydrocarbon reserves.

Referring to FIG. 3, in another embodiment in accordance with the invention, a system 100 for utilizing geological data acquired from a downhole communications network may include a first drill string 102a having a downhole communications network integrated therein and adapted to gather downhole data. The first drill string 102a may communicate with a remote server 126, and corresponding archival device 120, to upload data gathered by the first drill string 102a onto the server 126 and archival device 120. In certain embodiments, data is uploaded to the archival device 120 in real-time. For example, the first drill string 102a may be used to gather various types of data over time and at various points along the drill string 102a to monitor changes in the data over time. This may be used to determine the location of hydrocarbons within the reserve, which may move or migrate within the reserve over time as hydrocarbons are extracted. In certain embodiments, it is contemplated that the first drill string 102a could communicate with the archival device 120 by satellite 122, although other methods of wired or wireless communications are possible and within the scope of the invention.

A second drill string 102b may utilize data gathered by the first drill string 102a and residing on the server 126 and corresponding archival device 120. The second drill string 102b may either be a networked drill string 102b, like the first drill string 102a, or a conventional drill string 102b without a communications network. Like the first drill string 102a, the second drill string 102b may communicate with the archival device 120 by satellite 122, although other methods of wired or wireless communications are also possible. Data residing on the archival device 120 may be used to navigate, steer, or otherwise control the second drill string 102b. For example, the data may be used to direct the second drill string 102b toward subterranean hydrocarbon deposits. In selected embodiments, the second drill string 102b may have real-time access to data in the archival device 120 so it may be used as soon as it is available.

Because data residing on the archival device 120 may reflect changes in subterranean conditions and properties over time as measured by the first drill string 102a, this data may be used to more accurately direct the second drill string 102b toward hydrocarbon deposits. Thus, data gathered from a first drill string 102a may be used to more accurately control a second drill string 102b.

One notable advantage of the system 100 is the ability to network together drill strings 102a, 102b that are separated by significant distances. For example, drill strings 102a, 102b that are drilling on different leases, in a same or a different tract, may communicate with each other. Thus, data gathered from a first drill string 102a may be used to more accurately direct a second drill string 102b to oil and gas reserves. By networking these drill strings 102a, 102b together, the drill strings 102a, 102b may share information, potentially improving the performance of each.

Figure 4:
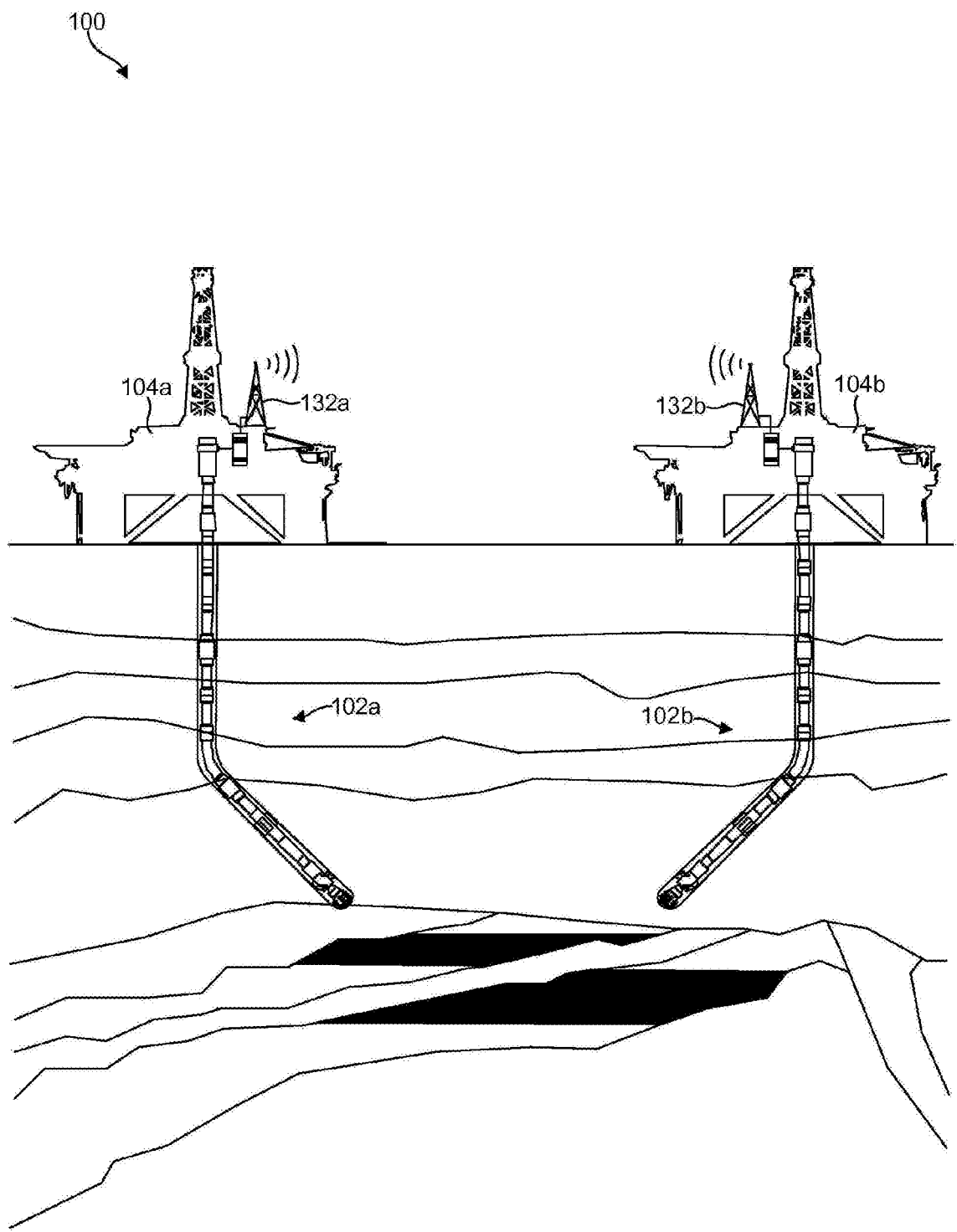
FIG. 4 is a cross-sectional view illustrating the use of real-time data, gathered from a first drill string, to direct a second drill string toward hydrocarbon reserves.

Referring to FIG. 4, in yet another embodiment, a system 100 for utilizing geological data acquired from a downhole communications network may include a first drill string 102a comprising a downhole communications network for gathering downhole data. The first drill string 102a may transmit data gathered therefrom from an antenna 132a, including real-time data or data gathered over time at various points along the drill string 102a. In other embodiments, the drill strings 102a, 102b may communicate using a hard-wired connection.

A second drill string 102b may receive the data transmitted from the first drill string 102a at an antenna 132b. Like the previous example, the second drill string 102b may either be a networked drill string like the first drill string 102a, or a conventional drill string 102b without a communications network. Data acquired by the second drill string 102b from the first drill string 102a may be used to navigate and steer the second drill string 102b toward hydrocarbon deposits. Thus, data gathered from a first drill string 102a may be used to guide a second drill string 102b to hydrocarbon deposits.

In the illustrated embodiment, the drill strings 102a, 102b are located on different drill rigs 104a, 104b or platforms 104a, 104b. Similarly, the drill strings 102a, 102b may be located on different tracts or leases. Nevertheless, in other embodiments, the drill strings 102a, 102b may be located on the same rig 104a or platform 104a. This is also true for the embodiments illustrated with respect to FIGS. 2 and 3. In embodiments where the drill strings 102a, 102b are located on the same rig 104a or platform 104a, wireless communication between antennas 132a, 132b may be unnecessary and a simple wired connection may suffice.

Referring to FIG. 5, as previously mentioned, data stored on the archival device 120 may be organized in a database to facilitate the management, search, and retrieval of the data contained therein. Such a database may provide a powerful tool for researchers in studying static or changing downhole conditions and in predicting the location of static or migrating hydrocarbon deposits. Such a database may also provide a valuable asset, the likes of which may be sold, leased, or otherwise marketed to various researching entities.

In selected embodiments, a database 134 for archiving data gathered from one or more drill strings 102 equipped with a communications network may include records 136 corresponding to each well that has been drilled or is being drilled. For example, in selected embodiments, each record 136 may include fields for storing a unique well identifier 138; the location 140 of the well; and the particular tract 142, if any, where a well is located. In certain embodiments, a well record 136 may identify a particular drill string 144 being used in the well. A drill string record 144 may include, for example, fields identifying downhole tools 146 used with the drill string; measurement devices 148 such as sensors used in the drill string; network devices 150 used in a communications network integrated into the drill string; contracts or leases 152 corresponding to the drill string; energy and production companies 154 drilling the well and/or renting or leasing the drill string; and service companies 156 servicing the well or drill string.

The database 134 may also, in certain embodiments, identify drilling events 158 (e.g., kicks, lost circulation, stuck pipe, tripping, etc.) that have occurred at each well. For example, an event record 160 may be created for each event that has occurred. Each event record 160 may include fields such as the type 162 of event (e.g., kick, lost circulation, stuck pipe, tripping, etc.) and the date 164 and time 166 of the event. Similarly, the database 134 may archive various measurements 170, such as geological measurements 172, which have been recorded and transmitted by way of the drill string communications network at each well. For example, geological measurement records 172 may identify the type 174 of measurement (e.g., resistivity, porosity, pressure, magnetism, temperature, induction, vibration, radioactivity, salinity, pH, permeability, electrical potential, etc.); the date 176 the measurement was recorded; the time 178 the measurement was recorded; the value 180 of the measurement (e.g., number of ohms-cm for resistivity, degrees Celsius for temperature, pascals for pressure, etc.); and the location 182 (i.e., depth, coordinates, etc.) where the measurement was recorded.

Likewise, the database 134 may also be used to archive drill string measurements 184. These measurements 184 may identify the type 186 of measurement (e.g., drill string inclination, acceleration, azimuth, weight-on-bit, mud flow rate, drill string RPM, tool wear, vibration, temperature, etc.); the date 188 the measurement was recorded; the time 190 the measurement was recorded; the value 192 of the measurement; and the location 194 where the measurement was recorded.

Similarly, the database 134 may also be used to archive measurements 196 associated with the drill string communications network. These measurements 196 may identify the type 198 of measurement (e.g., network data rate, bandwidth, traffic, packet loss, congestion, component temperature, error rate, etc.); the date 200 the measurement was recorded; the time 202 the measurement was recorded; the value 204 of the measurement; and the location 206 where the measurement was recorded. In other embodiments, the database 134 may also include fields or records providing information with respect to well production performance 208. Similarly, the database 134 may store other 210 types of information as needed.

One of ordinary skill in the art will recognize that information in the database 134, one embodiment of which has been described above, may be organized according to various different schemas or structures without departing from the essence of the invention. Similarly, it should also be noted that various fields, records, or other structures of the database 134 as described herein may be omitted, while others may be added, without departing from the essence of the invention. One of ordinary skill in the art will also recognize the various types of databases may be used to implement a database in accordance with the invention, including but not limited to relational databases, object-oriented databases, XML databases, flat-file databases, or the like.

Figure 6:
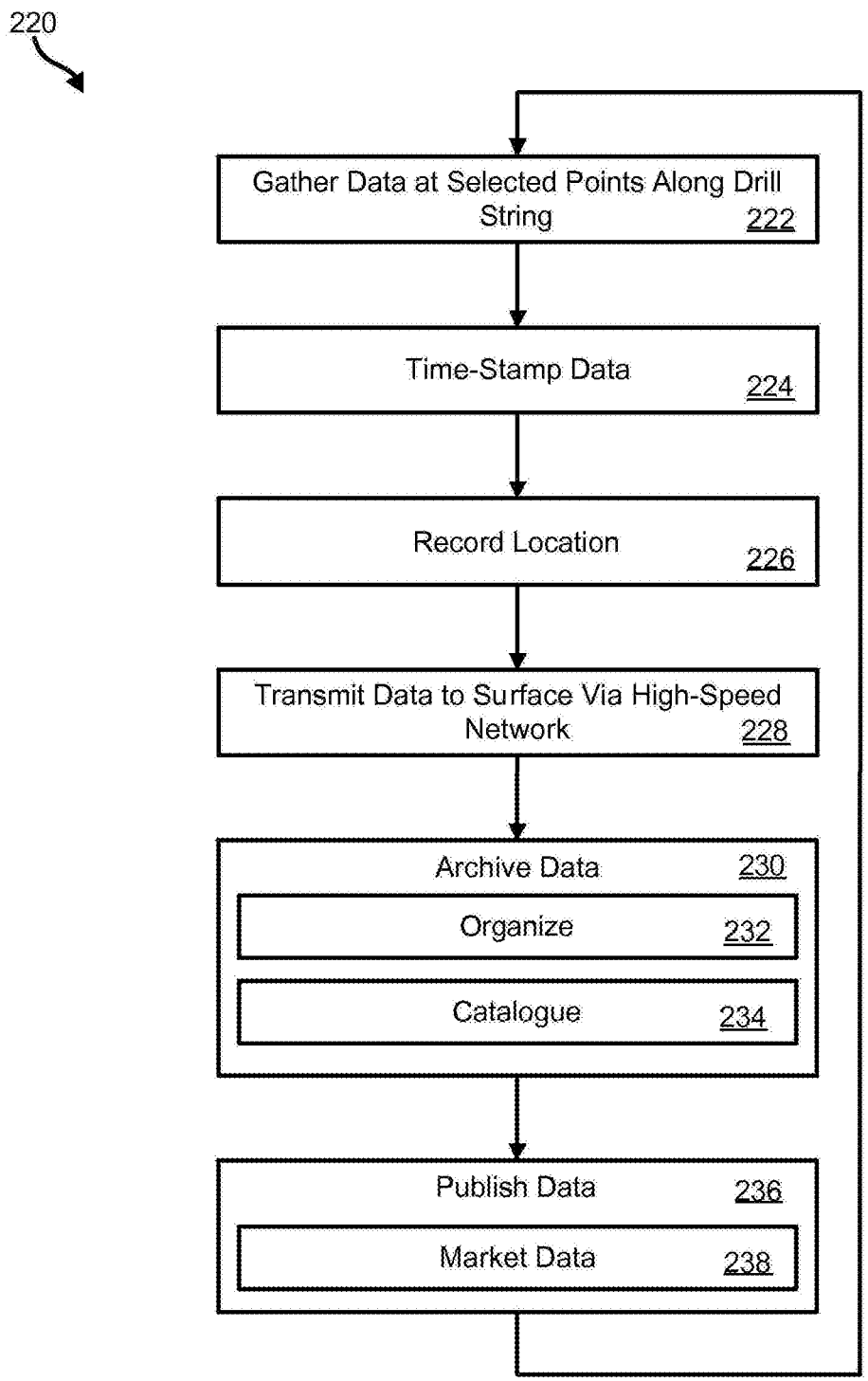
FIG. 6 is a flow chart illustrating one embodiment of a method for gathering, archiving, and disseminating subterranean geological data.

Referring to FIG. 6, one embodiment of a method 220 for gathering, archiving, and disseminating subterranean geological data may include gathering 222 various types of data (e.g., porosity, resistivity, permeability, pressure, etc.) at selected points along a drill string; time-stamping 224 the data such that the time and date of the measurement is precisely recorded; recording 226 the location (e.g., depth, coordinates, etc.) where the data was gathered along the drill string; transmitting 228 the data to the surface by way of a high-speed network integrated into the drill string; archiving 230 the data; and publishing 236 the data such that it is accessible to researchers or other entities.

In selected embodiments, archiving 230 the data may include organizing 232 and cataloging 234 the data to facilitate the management, search, and retrieval of such data, such as may be accomplished with a database. For example, the data may be organized according to the time-stamp or location associated with the data. Furthermore, publishing 236 the data may also include marketing 238 the data, including but not limited to selling, leasing, and licensing the data to researchers or other entities. Publishing 236 may also include providing the data to researchers or other entities by way of a database accessible over the Internet or other public or private network; on a computer readable medium such as a CD-ROM, DVD, hard drive, tape drive, floppy disk, flash drive, or the like; or on a printed medium.

Figure 7:
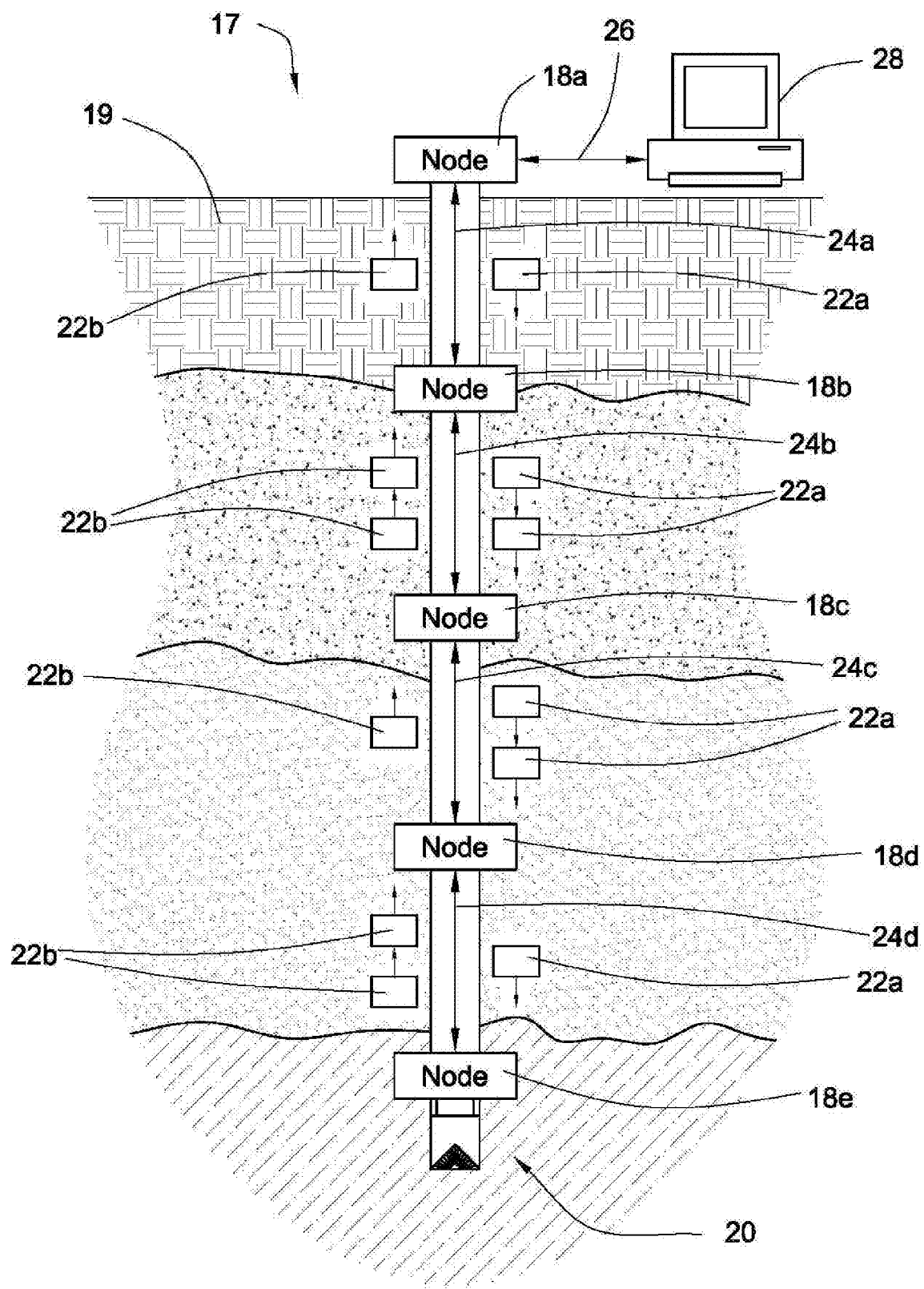

Referring to FIG. 7, in selected embodiments a downhole network 17 may be used to transmit information along a drill string 14. A downhole network 17 may include multiple nodes 18*a-e* spaced up and down a drill string 14. The nodes 18*a-e* may be intelligent computing devices 18*a-e*, or may be less intelligent connection devices, such as hubs or switches located along the length of the network 17. Each of the nodes 18 may or may not be addressed on the network 17. A node 18*e* may be located to interface with a bottom hole assembly 20 located at the end of the drill string 14. A bottom hole assembly 20 may include a drill bit, drill collar, and other downhole tools and sensors designed to gather data and perform various tasks.

Other intermediate nodes 18*b-d* may be located or spaced to act as relay points for signals traveling along the downhole network 17 the network 17 and to provide interfaces 18*b-d* to various tools or sensors located along the length of the drill string 14. Likewise, a top-hole node 18*a* may be located at the top or proximate the top of a drill string 14 to act as an interface to an analysis device 28, such as a personal computer 28.

Communication links 24*a-d* may be used to connect the nodes 18*a-e* to one another. The communication links 24*a-d* are cables integrated directly into tools 16 of the drill string 14, routed through the central bore of a drill string, or routed externally to the drill string. Likewise, in certain contemplated embodiments in accordance with the invention, the communication links 24*a-d* may be wireless connections. In certain embodiments, the downhole network 17 may function as a packet-switched or circuit-switched network 17.

As in most networks, packets 22*a*, 22*b* may be transmitted between nodes 18*a-e*. The packets 22*b* may be used to carry data from tools or sensors, located downhole, to an up-hole node 18*a*, or may carry protocols or data necessary to the functioning of the network 17. Likewise, selected packets 22*a* may be transmitted from up-hole nodes 18*a* to downhole nodes 18*b-e*. These packets 22*a*, for example, may be used to send control signals from a top-hole node 18*a* to tools or sensors located proximate various downhole nodes 18*b*-*e*. Thus, a downhole network 17 may provide an effective means for transmitting data and information between components located downhole on a drill string 14, and devices located at or near the surface of the earth 19.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

Figure 8:
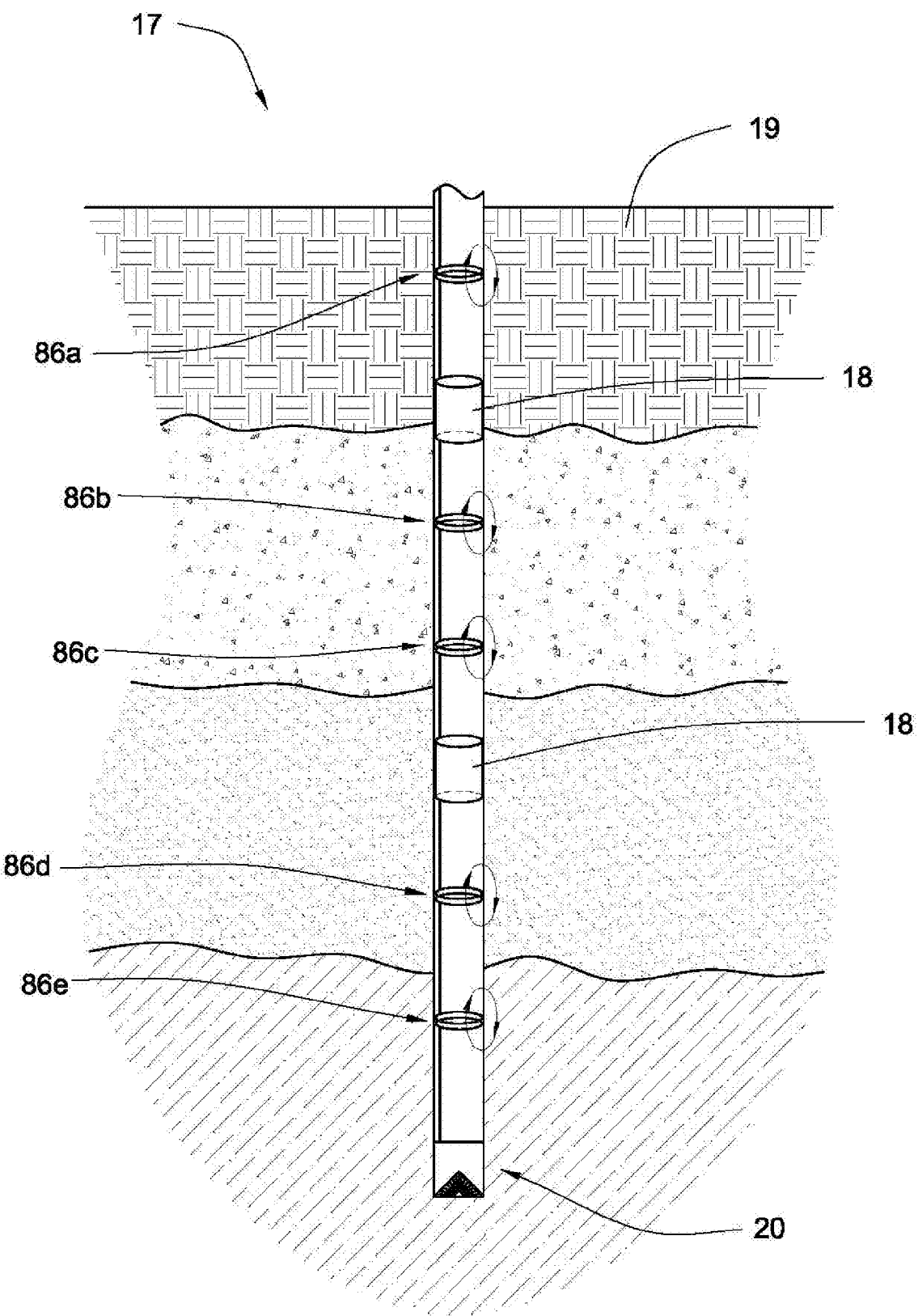

Referring to FIG. 8, in one embodiment, a downhole network 17 in accordance with the invention may include various nodes 18 spaced at selected intervals along the network 17. Each of the nodes 18 may be in operable communication with a bottom-hole assembly 20. As data signals or packets trawl up and down the network 17, transmission elements 86*a*-*e* may be used to transmit signals across tool joints of a drill string 14.

As illustrated, in selected embodiments, inductive coils 86*a*-*e* may be used to transmit data signals across tool joints. An inductive coil 86 may convert an electrical data signal to a magnetic field. A second inductive coil may detect the magnetic field and convert the magnetic field back to an electrical signal, thereby providing signal coupling across a tool joint. Thus, a direct electrical contact is not needed across a tool joint to provide effective signal coupling. Nevertheless, in other embodiments, direct electrical contacts may be used to transmit electrical signals across tool joints.

We claim:

1. A system for sharing information between downhole drill strings, the system comprising:
    a first drill string comprising multiple sections drill pipe with a central bore adapted to receive a drilling fluid;
    a communications network integrated into the first drill string, the communications network comprising a plurality of nodes spaced at selected intervals along the first drill string to gather subterranean data along the first drill string;
    a second drill string also comprising a communications network with a plurality of nodes;
    a real-time, above surface, communication link to a shared server between the first drill string and second drill string to transit the subterranean data from the first drill string to the second drill string, the subterranean data used to control the second drill string;
    wherein the nodes of the communications networks of the first and second drill strings are in electrical communication with each other through data couplers and high-speed data cables.

2. The system of claim 1, wherein the subterranean data is further used to steer the second drill string towards hydrocarbon reserves.

3. The system of claim 1, wherein the second drill comprises a communications network integrated into the second drill string, the communications network comprising a plurality of nodes spaced at selected intervals along the second drill string.

4. The system of claim 1, further comprising at least one sensor to gather the subterranean data, the at least one sensor selected from the group consisting of an accelerometer, an inclinometer, a pressure transducer, a magnetometer, a gyroscope, a temperature sensor, a gamma ray sensor, a neutron sensor, a seismic sensor, a sonic sensor, a coring tool, a mud logging device, a resistivity sensor, an induction sensor, a radioactivity sensor, an imaging device, a GPS device, a Hall-effect sensor, a permeability sensor, a porosity sensor, a vibration sensor, and an electrical potential sensor.

5. The system of claim 1, wherein the first and second drill strings are located on different leases.

6. The system of claim 5, wherein the first and second drills strings are located on the same tract.

7. The system of claim 5, wherein the first and second drill string are located on a different tract.

8. A method for sharing information between downhole drill strings, the method comprising:
    gathering subterranean data with a first drill string comprising multiple sections drill pipe with a central bore adapted to receive a drilling fluid;
    transmitting the subterranean data along a communications network integrated into the first drill string, the communications network comprising a plurality of nodes spaced at selected intervals along the first drill string;
    providing a second drill string also comprising a communications network with a plurality of nodes;
    transmitting, in real-time, above surface the subterranean data from the first drill string to the second drill string via a shared server;
    controlling the second drill string using the subterranean data;
    wherein the nodes of the communications networks of the first and second drill strings are in electrical communication with each other through data couplers and high-speed data cables.

9. The method of claim 8, wherein controlling comprises steering the second drill string towards hydrocarbon reserves.

10. The method of claim 8, wherein the second drill comprises a communications network integrated into the second drill string, the communications network comprising a plurality of nodes spaced at selected intervals along the second drill string.

11. The method of claim 8, wherein the first and second drill strings are located on different leases.

12. The method of claim 11, wherein the first and second drills strings are located on the same tract.

13. The method of claim 11, wherein the first and second drill strings are located on different tracts.

14. A system for sharing information between downhole drill strings, the system comprising:
    a first drill string comprising multiple sections drill pipe with a central bore adapted to receive a drilling fluid;
    a communications network integrated into the first drill string, the communications network comprising a plurality of nodes spaced at selected intervals along the first drill string to gather subterranean data along the first drill string;
    an above surface archival device in communication with the first drill string to archive, over a period of time, the subterranean data gathered by the first drill string;
    a second drill string also comprising a communications network with a plurality of node; and
    an above surface, communication link to a shared server to transmit the subterranean data from the archival device to the second drill string, the subterranean data used to control the second drill string;
    wherein the nodes of the communications networks of the first and second drill strings are in electrical communication with each other through data couplers and high-speed data cables.

* * * * *